United States Patent Office 3,230,153
Patented Jan. 18, 1966

3,230,153
PROCESS FOR THE PRODUCTION OF REGULIN BY *ASPERGILLUS RESTRICTUS* AND RESULTING PRODUCT
Birger H. Olson, Lansing, and Gordon L. Goerner, East Lansing, Mich., assignors to the State of Michigan
No Drawing. Filed June 26, 1963, Ser. No. 290,600
4 Claims. (Cl. 195—81)

The present invention relates to a new product which has been designated regulin and to the preparation of the same.

The product, regulin, of the present invention is produced by fermentation of an organism discovered as an isolate from a sample of moist soil adjacent to a stream in the State of Michigan. The organism has been designated as MDH 17070 by the Michigan Department of Health, located in Lansing, Michigan. A culture of MDH 17070 has been deposited with the U.S. Department of Agriculture, Northern Utilization Research and Development Division, located in Peoria, Illinois, and has been assigned the numerical designation NRRL 3050. Present investigations show the regulin producing organism to be a unique strain of *Aspergillus restrictus* having the characteristics of the organism set forth in the Manual of Aspergilli by Thom and Raper, along with the characteristics described below.

The conidiospores measure from 100 to 350 microns. The vesicles of the conidiospores are up to 16 microns in diameter and are flask shaped. The sterigmata are single and approximately 3.5 x 6 microns. The conida are nearly spherical to elliptical and are rough and spinulose. The conidiospores are about 3.5 microns in diameter. No perithecia are found. This culture is appreciably different from the *Aspergillus restrictus* found to produce restrictocin, in that the NRRL 3050 culture is very stable and no sectoring is noticed. The culture grows very well on potato dextrose agar, extremely poorly on regular Czapek agar, but grows better on Czapek agar supplemented with 20% sucrose. An unusual feature of this organism is that it is capable of growing at temperatures up to 45° C., sporulating heavily and giving normal appearing growth. The culture when grown on potato dextrose agar is of a dark, dull green appearance, although the outer periphery is of a definite bluish green cast.

Fermentation of NRRL 3050 is carried out in submerged form with agitation and aeration in an aqueous nutrient medium containing available sources of carbon and nitrogen. With temperatures of around 30° C. the fermentation is complete in approximately two days. The regulin produced during fermentation is recovered from the fermented broth or beer, after filtering off the insoluble material, by adsorption on a phosphate buffered carboxylic ion exchange resin prepared as described below, followed by elution with acid such as 1 N HCl acid, sodium chloride, or the like. The eluate from the column may be concentrated under vacuum and dialysed to remove mineral salts and other low molecular weight substances. Following dialysis the regulin may be quick-frozen and dried under high vacuum. A further stage of purification on a finely divided phosphate buffered carboxylic ion exchange resin, as noted below, is by gradient elution chromatography. Regulin produced as described above is soluble in water, dilute hydrochloric acid, and physiological saline. Measurable amounts of the dry material do not extract into methanol, butanol, ethyl ether or ethyl acetate.

The stability of regulin at room temperature at various pH values can be illustrated as follows: In each case the stability was measured at the end of 30 minutes. pH 2, stable; pH 7, stable; pH 10, stable.

Chemically, the regulin product prepared as described above and in the examples below, gives positive sulfur, ninhydrin and biuret tests, and negative starch and Molisch tests. The regulin product can be readily adsorbed on activated carbon and also can be adsorbed on strongly basic (IRA 401 OH form) ion exchange resins.

The following examples will serve to illustrate the invention.

EXAMPLE I

| | Concentration as percent |
|---|---|
| Corn starch | 2 |
| Enzymatic casein hydrolyzate | 2 |
| Sodium chloride | 0.5 |
| Antifoam (lard oil with 3% octadecanol) | 0.5 | pH not adjusted, but is in the range of 6.5 to 7.0.

One-tenth of one percent of meat extract, e.g. aqueous beef extract, may be added to this medium since with some lots of enzymatically hydrolyzed casein the meat extract is stimulatory, but in others sufficient active ingredients are present to adequately satisfy the requirements of the organism. The corn starch, casein hydrolyzate (NZ Amine B), sodium chloride, and beef extract are mixed with water to provide the proportions noted above and sterilized with steam. The resulting sterile medium is inoculated with a culture of NRRL 3050 organism described above and is allowed to grow under controlled temperature at about 30° C. with agitation and aeration (0.25 to 0.5 volume of air/volume of medium per minute) for about 48 hours. At the end of this period the fermented broth is press-filtered to remove mycelium and other insoluble material. These materials can be discarded as the desired active material is water-soluble and is present in the resulting filtrate.

A cationic carboxylic exchange resin (Amberlite IRC–50) is first converted to the sodium form by mixing 1 volume of exchange resin with about 10 volumes of 4% (1 N) sodium hydroxide. The resin is next separated from the alkaline solution, washed with distilled water and suspended in water. To this suspension sufficient phosphoric acid is then added with stirring to provide the mixture with a pH of about 6.8. The supernatant from this resin is then removed, additional distilled water is added to the resin, and the pH is again adjusted to 6.8 with phosphoric acid. The resulting resin which may be termed to be in phosphate buffered form is finally separated from the solution and after washing with 5 volumes of water is ready for use as noted below.

The filtrate containing the active material described above is added to a column containing the phosphate buffered exchange resin, prepared as described, at a flow rate of about 0.2 ml. per minute per 1 ml. of resin. One volume of resin will remove the active material from about 50 volumes of filtrate. The resin column containing the active material is then washed with water until the water wash has little or no color. The active material remaining on the resin column is then eluted from the column with 1 N HCl. The volume of eluate which contains the active material is about $1/100$ the volume of the original filtrate. For example, if the active material from 10 liters of filtrate is adsorbed on the column, the active material after elution from the column may be contained in about 100 ml. of eluate. The eluate has a pH of about 6.5. The eluates are taken in cuts of $1/500$ of the original filtrate volume and are kept separate. The elution is continued until the hydrochloric acid has broken through the column and the eluate is acid. A sample from each eluate is examined in a Cary Recording Ultraviolet Spectrophotometer and the cuts which have the maximum absorption in the 2,800 A. range are the cuts which are pooled. The absorption spectra recorded by the spectrophotometer indicate the presence of other contaminating materials, some of which can be excluded by the proper selection of cuts. The active material normally appears in the fourth and fifth eluates. The proper eluates are then pooled on the basis of these ultraviolet absorption spectra and are concentrated in vacuo in a circulating evaporator with a maximum temperature of 35° C. The eluates are concentrated approximately three-fold. The concentrate is then placed in cellophane membrane tubing and dialyzed against distilled water in a stirred dialysis bath at 0–4° C. After dialysis the material may be quick-frozen and dried to yield a white fluffy product or it may be further purified according to the following procedure.

The further purification of regulin is carried out by gradient elution on a cationic carboxylic acid resin of the type, Amberlite XE 64. The size of the resin is 50 to 150 mesh per square inch as determined by wet screening of the resin. The gradient used is a concentration gradient of phosphate buffer pH 6.5. Preparation of resin is one of adjustment of the resin to the sodium form by mixing 1 volume of exchange resin with about 10 volumes of 4% (1 N) sodium hydroxide and separating the resin from this solution, washing it with distilled water and suspending in water. The pH is then adjusted in this case to 6.5 with phosphoric acid. This solution is removed and the operation repeated and the resin equilibrated with the phosphate buffer of the molarities at which the gradient is begun. In this case the molarity of the phosphate is 0.1 molar at the beginning. The resin is then suspended in 0.1 M pH 6.5 phosphate and poured into a chromatographic column with a sintered glass plate at the bottom. The column is 40 mm. in diameter and is poured to a height of between 50 and 54 cm. packed volume. The column is then washed with a small quantity of sodium phosphate buffer 0.1 M pH 6.5 and the column effluent is measured for pH. The pH should be ±0.05 of the pH of the buffer itself. The sample of regulin which is to be purified should be dissolved in a very small quantity of 0.1 M phosphate buffer, pH 6.5 and added to the column without disrupting the surface. Up to about 5 gm. of the regulin dry material can be purified on a column of this size. When the sample has been added to the column, the developing buffer from the mixing chamber is started through the column. The mixing chamber for this size column has a volume of 2,250 ml. and is continuously agitated. To the mixing chamber is added 0.9 M phosphate buffer, pH 6.5 from a reservoir above it. Twenty ml. fractions are taken throughout the run by a fraction collector. Each fraction is examined for optical density at 2,760 A. The values are plotted on a graph to observe the separation of various components present in the crude material. At least 3 substances are removed in the cuts prior to the active component regulin. Regulin first appears in about tube 75 and continues to be eluted from the column until tube about 100 is reached. The cuts from the active peak, that is, those tubes in the neighborhood of 75 to 100 are combined into a pool, an ultraviolet spectrum is determined and the tubes are dialyzed as before. The material after dialysis is then quick-frozen and dried under high vacuum yielding a pure product of regulin.

EXAMPLE II

This example follows the procedure of Example I, except that in place of 1 N HCl being used as the eluting material from a carboxylic resin, a 1 N sodium chloride solution is used instead. Other stages of purification are the same. The nutrient medium used to grow NRRL 3050 for the production of regulin contains, as noted above, available carbon and nitrogen. As for carbon, various sources such as starches or sugars can be employed. Proteins and amino acids may serve to provide both carbon and nitrogen. Specifically for nitrogen, investigations show that nitrogen should be present in the amino acid or available amino acid type forms such as enzymatic casein hydrolyzate, peptone, peptides, and the like. Other illustrative media that can be used in the present invention are as follows:

| | Concentrations in percent |
|---|---|
| Corn starch | 2 |
| Peptone | 1 |
| Meat extract | 1 |
| Sodium chloride | 0.5 |
| Corn meal | 2 |
| Soybean meal | 2 |
| Corn steep liquor | 1 |
| Brewers yeast | 0.5 |
| Dried butyl fermentation solubles (BY–100) | 0.5 |
| Glycerol | 1 |
| Peptone | 2 |
| Meat extract | 1 |
| Sodium chloride | 0.5 |
| Glucose | 1 |
| Whole wheat flour | 1 |
| Corn meal | 1 |
| Soybean meal | 1 |
| Yeast extract | 0.5 |
| Meat extract | 0.5 |
| Peptone | 0.5 |

The concentrations in the media can vary and optmium amounts can be readily ascertained by preliminary test.

The concentration gradients can be varied according to the pH of the column and buffers used for the purification of regulin. Buffers from pH 5.5 to 7.5 and concentration gradients have been varied from 0.01 to 1.0 M. The higher the pH of the resin and phosphate buffer the fewer number of tubes are required before the active material is eluted. The active material can be caused to be eluted more slowly at the high pH's by use of a more dilute buffer gradient.

An alternate procedure which may be used for the addition of the regulin to the gradient elution chromatogram is as follows:

The dialyzed regulin solution, prior to quick-freezing and drying, may be passed over an adsorbing column of approximately 40 to 60 ml. of cation carboxylic acid resin (Amberlite XE 64) prepared as for the gradient column. The column is 20 mm. in diameter. The entire quantity (5 gm.) of regulin may be adsorbed on the adsorbing column, washed with 50 ml. of water, and suspended in 50 ml. of the initial gradient buffer, and the suspension placed on the surface of the gradient column. The procedure then continues as described above.

The regulin of the present invention is of the polypeptide type, as were also alpha sarcin, described in the Patent of Birger H. Olson, No. 3,104,204, filed July 11, 1960, and also restrictocin described in the Patent of Olson et al., No. 3,104,208, filed September 6, 1960. Although these products are peptides there are a number of differentiating characteristics as may be shown by gradient elution chromatography, by ultraviolet spectrum, and by infrared red spectrum, as well as other properties noted below.

Regulin was found to contain carbon, hydrogen, nitrogen, oxygen and sulfur, as determined by the Clark Microanalytical Laboratory of Urbana, Illinois. They report 51.7% carbon, about 6.40% hydrogen, about 16.17% nitrogen, about 0.26% sulfur, and about 23.42% oxygen. Based on this determination the appropriate empirical formula for regulin is $C_{532}H_{787}O_{181}N_{142}S$, with a minimum molecular weight of approximately 12,300.

The regulin prepared as described above exhibits characteristics absorption bands in the infrared region of the spectrum when compressed in a KBr pellet and run in a Perkin and Elmer Infracord. The major peaks are found as follows: 3,300 reciprocal centimeters (3.02 microns), 1,650 reciprocal centimeters (6.02 microns), 1,520 reciprocal centimeters (6.61 microns). Minor peaks were found as follows: 2,950 reciprocal centimeters (3.38 microns), 1,440 reciprocal centimeters (6.95 microns), 1,390 reciprocal centimeters (7.2 microns), and 1,230 reciprocal centimeters (8.12 microns). The ultraviolet absorption spectra also possessed the following maxima and minima in water; 0.1 N HCl; and 0.1 N sodium hydroxide.

*Ultraviolet adsorption spectra*

| Solvent | Maximum A. | Minimum A. |
|---|---|---|
| Water | 2,780 | 2,500 |
| 0.1 N HCl | [1] 2,780 | 2,500 |
| 0.1 N NaOH | 2,880 | 2,845 |
|  | 2,818 | 2,700 |

[1] Round peak.

Regulin was found to be non-reactive against any of the bacterial species or fungal species tested and it is certain that it is different from any of the antibiotics of the Aspergilli described in Spector's Handbook of Toxicology, vol. II (Antibiotics), because these old antibiotics either are soluble in acetone or other like organic solvents and/ or they are active against bacteria. Regulin is not active against any of the bacteria listed in Spector and it is not soluble in acetone or like solvents.

Regulin, the product of the present invention, has been found to have antitumor activity in certain induced tumors (various types of sarcoma and carcinoma) in animals. This activity has been substantiated by Sloan-Kettering Institute for Cancer Research, the Wisconsin Alumni Research Foundation, Stanford Research Foundation and The Armour Research Foundation of Illinois Institute of Technology.

The animals used for the evaluation against induced tumors have largely been mice. However, in addition to these tests, the Michigan Department of Health Laboratories have found that regulin is also capable of effecting the change in naturally occurring tumors in dogs. Dogs with lymphosarcoma, carcinoma and fibrosarcoma have been treated and the life of the dog has been extended, some of which are presently alive. Pathological observation of biopsis taken before and after treatment indicate that the malignant tissue shown in the pretreatment biopsy has been reversed to normal tissue in the post-treatment biopsy. In the treatment of dogs, aqueous solutions of regulin were injected intravenously to provide each dog with 0.01 mg. of regulin per kilogram of body weight. The injections were made each day for three days and then stopped for three days and then continued for three days. The tests on mice with implanted tumors were made in accordance with the standard NIH procedures by injection intraperitoneally using various concentrations of regulin. Results obtained with mice implanted with sarcoma 180 are shown in the table below:

*Table*

| Daily dose Mg/K: | Percent inhibition of tumors |
|---|---|
| 1.0 | toxic |
| 0.5 | 88 |
| 0.25 | 85 |
| 0.125 | 84 |
| 0.062 | 66 |

What is claimed is:

1. A process for the production of regulin which comprises cultivating the organism *Aspergillus restrictus* NRRL 3050 under submerged aerobic conditions in an aqueous nutrient medium containing an available source of carbon and available amino acids as a source of nitrogen, and then recovering the regulin from the resulting fermented broth.

2. The process of claim 1 where the regulin in the broth is adsorbed on a phosphate buffered carboxylic ion exchange resin, the resin is eluted with hydrochloric acid, the eluate is dialyzed to remove mineral salts and the salt-free solution is freeze-dried to recover regulin.

3. The product produced by the process of claim 1, said product being soluble in water, dilute hydrochloric acid and physiological saline and insoluble in methanol, butanol, ethyl ether and ethyl acetate, being characterized by positive sulfur, ninhydrin and biuret tests and negative starch and Molisch tests and by exhibiting characteristic absorption bands in the infrared region of the spectrum in a KBr pellet at the following frequencies expressed in microns; major peaks at 3.02; 6.02 and 6.61; and minor peaks at 3.38; 6.95; 7.2; and 8.12; said product being composed of C, H, N, O and S.

4. The process of producing regulin which comprises cultivating the organism *Aspergillus restrictus* NRRL 3050 under submerged aerobic conditions in an aqueous nutrient medium containing an available source of carbon and available amino acids as a source of nitrogen, separating the insoluble material from the resulting fermented broth, adsorbing the regulin in the broth on a phosphate buffered cationic carboxylic exchange resin, eluting the regulin adsorbed on the exchange resin, dialyzing the resulting eluate and purifying the regulin using a cationic carboxylic exchange resin by gradient elution chromatography.

References Cited by the Examiner

UNITED STATES PATENTS 3,104,204  9/1963  Olson _____ 167—65
3,104,208  9/1963  Olson et al. _____ 195—80

A. LOUIS MONACELL, *Primary Examiner.*

UNITED STATES PATENT OFFICE
CERTIFICATE OF CORRECTION

Patent No. 3,230,153                        January 18, 1966

Birger H. Olson et al.

It is hereby certified that error appears in the above numbered patent requiring correction and that the said Letters Patent should read as corrected below.

In the title, line 2, for "REGULIN" read -- MITOGILLIN --; column 1, lines 12, 14, 24, 53, 61, 65, and 70, column 2, lines 3 and 6, column 3, lines 17, 40, 43, 55, 63, and 71, column 4, lines 41, 43, 47, 52, 63, 68, and 70, column 5, lines 20, 26, 29, 40, 48, and 49, column 6, lines 1, 13, 18, 20, 24, 36, 42, 44, and 45, for "regulin", each occurrence, read -- mitogillin --; column 4, lines 6 to 26, strike out the tabulation and insert instead:

|  | Concentrations in percent |
|---|---|
| Corn starch | 2 |
| Peptone | 1 |
| Meat extract | 1 |
| Sodium chloride | 0.5 |
| Corn meal | 2 |
| Soybean meal | 2 |
| Corn steep liquor | 1 |
| Brewers yeast | 0.5 |
| Dried butyl fermentation solubles (BY-100) | 0.5 |
| Glycerol | 1 |
| Peptone | 2 |
| Meat extract | 1 |
| Sodium chloride | 0.5 |
| Glucose | 1 |
| Whole wheat flour | 1 |
| Corn meal | 1 |
| Soybean meal | 1 |
| Yeast extract | 0.5 |
| Meat extract | 0.5 |
| Peptone | 0.5 |

Signed and sealed this 5th day of September 1967.

(SEAL)
Attest:

ERNEST W. SWIDER                        EDWARD J. BRENNER
Attesting Officer                        Commissioner of Patents